Nov. 23, 1954
G. T. BALFE
2,695,186
METAL GASKET
Filed Feb. 16, 1949
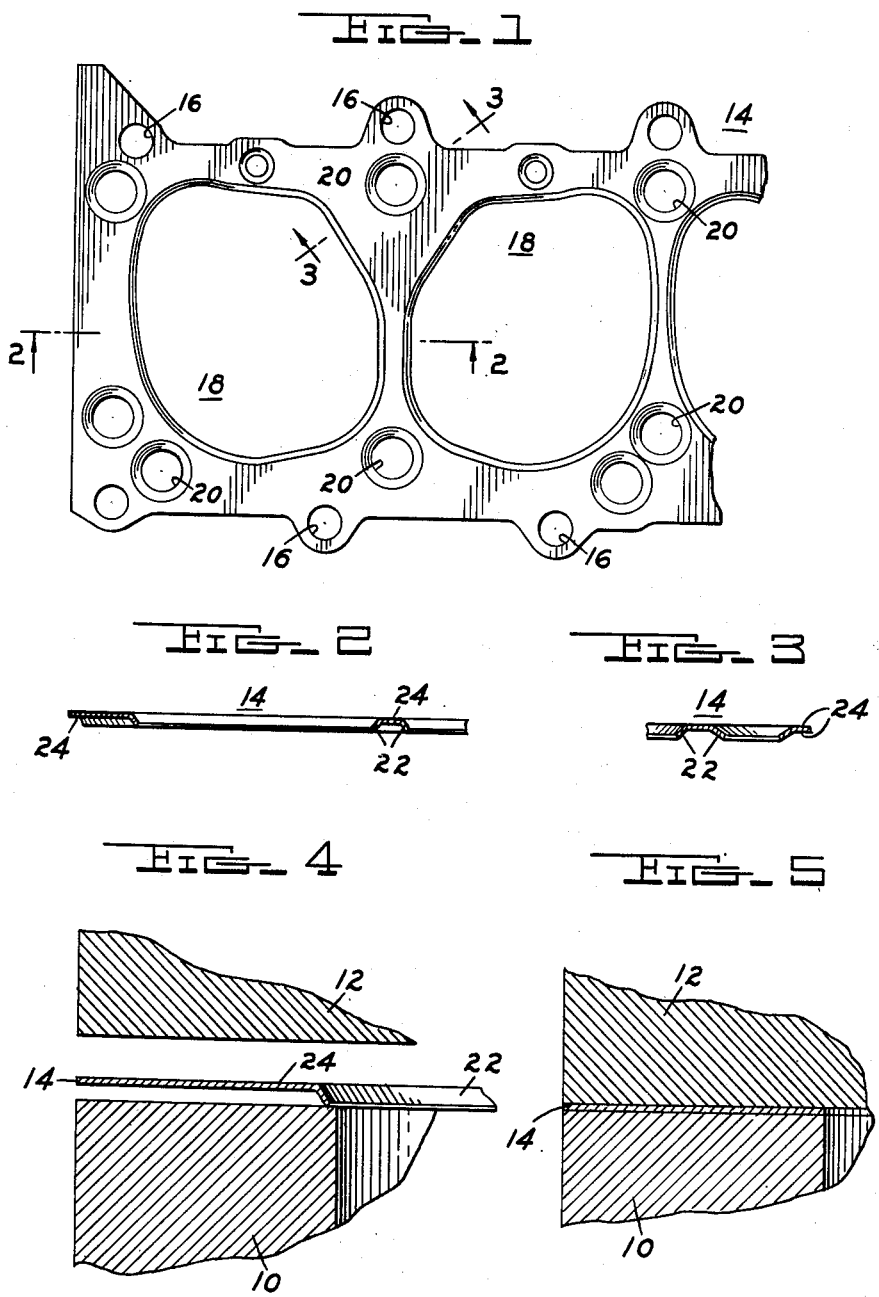
INVENTOR.
GEORGE T. BALFE
BY
Burton & Parker
ATTORNEYS United States Patent Office 2,695,186
Patented Nov. 23, 1954

2,695,186

METAL GASKET

George T. Balfe, Detroit, Mich., assignor to Detroit Gasket & Manufacturing Company, Detroit, Mich., a corporation of Michigan Application February 16, 1949, Serial No. 76,811

4 Claims. (Cl. 288—31)

This invention relates to improvements in gaskets. It is illustrated as embodied in a cylinder head gasket though it is adaptable to gaskets for widely different uses.

Gaskets of this character have heretofore been commonly formed of a plurality of layers of materials, as for example asbestos fibers, copper, steel and other suitable heat resisting materials.

Cylinder head gaskets are provided with a plurality of openings. These openings correspond with the combustion chamber and cooling fluid openings in the cylinder block and head. Such a gasket is adapted to be held under compression between the cylinder block and the cylinder head. It is designed to provide a seal about the joints formed between the head and the block surrounding the fluid pressure openings.

An object of this invention is to provide an improved gasket which is simple, cheap, light in weight and is designed to furnish an effective seal. When embodied in a cylinder head gasket it is designed to provide an effective seal between the block and the head when the head is secured upon the block. When the gasket is used between other cooperating parts it serves a similar purpose.

This improved gasket is formed of a single sheet of heat resisting flexible metal provided with the usual fluid pressure openings which openings are generally of an arcuate contour. The metal sheet is coated upon opposite sides with a layer of heat resisting compressible plastic coating material. The margin of the metal sheet surrounding each fluid pressure opening is deformed by the bending of the margin out of the plane of the sheet and at an angle thereto and toward the opening.

When the gasket is placed under compression normal to its plane, between the cooperating parts to be sealed thereby, such angular marginal flange is resistingly flattened. Flattening of this angular marginal portion is strongly resisted particularly about an arcuate opening. Such flattening so tensions this angular margin as to urge it tightly against the two cooperating surfaces between which the gasket is disposed. Throughout the extent of the flattened marginal flange the gasket is strongly tensioned against the adjacent surfaces of the cooperating members which hold it under compression. Such line of tight contact is immediately surrounding the fluid pressure openings. Such angular marginal flange, notwithstanding its resistance to flattening, is however so substantially flattened out that the gasket establishes surface contact substantially throughout its entire area with the adjacent cooperating members which hold it under compression.

Other objects, advantages, and meritorious features will more fully appear from the following specification, claims, and accompanying drawing, wherein:

Fig. 1 is a plan of a fragment of a cylinder head gasket embodying the invention;

Fig. 2 is a sectional view taken on the line 2—2 of Fig. 1;

Fig. 3 is a sectional view taken on the line 3—3 of Fig. 1;

Fig. 4 is a sectional view through a fragment of the gasket and associated fragments of cylinder block and cylinder head showing the gasket free from pressure; and Fig. 5 is a view similar to Fig. 4 showing the gasket under compression.

In the drawing a fragment of a cylinder block is indicated as 10, a fragment of a cylinder head is indicated as 12 and my improved gasket is indicated generally as 14. The cylinder head 12 is adapted to be secured to and tightened down upon the block by means of studs not shown but which construction is well understood. The apertures 16 through the gasket are stud openings. The apertures 18 through the gasket are combustion cylinder registering openings. The apertures 20 through the gasket are cooling fluid openings.

The gasket itself consists of a single layer or core of sheet metal. Such core may be formed of any suitable flexible metal sheet such as steel. Other suitable material might be used. A suitable thickness for a steel sheet is .015. Such core is provided with the apertures 16, 18, and 20 above described. These openings are of arcuate contour. Such metal sheet is deformed about each or about desired aperture margins by bending the margin of the metal sheet about the aperture out of the plane of the sheet and on an angle projecting toward the aperture as shown at 22.

Such marginal flange 22 is shown as bent out of the plane of the sheet to an angle of less than 90°. The extent of angular bend may vary depending upon the character of the material and upon the extent of resistance to flattening out which is desired. The angular bend about the cooling fluid apertures 20 may be less than about the combustion chamber apertures 18 as shown in Fig. 3. The angle of bend about a combustion chamber aperture might be 60° while about the cooling fluid apertures a bend of 40° might be satisfactory.

Each surface of the core sheet is coated with a suitable compressible plastic heat resisting coating 24. Such coating may be a suitable thermosetting resin. The thickness of the coating may be .001 on each surface. One such coating material which has been found satisfactory is a thermosetting urea alkyd resin composition being a mixture of a urea resin and an alkyd resin in suitable proportions to form a satisfactory heat resisting compressible plastic coating.

When the gasket embodying this invention is compressed between cooperating members to be sealed thereby, such as a cylinder block and a cylinder head, the angular flange 22 is flattened out substantially as shown in Fig. 5. The edge of the flange 22 bears with extreme pressure against the surface of the block immediately adjacent the fluid pressure opening. It is not possible, with the pressures that are employed normally to secure the head of a cylinder to its block, to completely and smoothly flatten out a flange having an arcuate contour, such as is shown, without creating tensions in the metal throughout the length of the flange which strongly urges such marginal flanges against the two surfaces between which it is compressed. The arcuate flange very strongly resists the flattening thereof. The material, however, is sufficiently flexible and thin so that the flange is substantially flattened out. Throughout the length of the flange a tension is set up which exerts a substantial pressure against the surfaces between which the flange is compressed.

The surfaces between which the gasket is secured are not completely smooth. Small irregularities and scratches will appear therein. The plastic coating on the two surfaces of the gasket is forced into these small irregularities so as to fill them thereby making a more perfect seal. The angular margin 22 of the gasket is flattened out to such an extent and so tensioned against the surfaces of the block and head that hot gases are prevented from blowing back over the gasket and burning away the plastic coating.

What I claim is:

1. A gasket formed of a thin planar sheet of metal having an opening therethrough and having a single planar marginal portion surrounding and immediately adjacent to said opening bent out of the plane of said gasket sheet, the free edge of said marginal portion lying outside the plane of said gasket sheet.

2. A gasket formed of a thin planar sheet of metal having an opening therethrough and having a single planar marginal portion surrounding and immediately adjacent to said opening bent out of the plane of said gasket sheet to an angle obtuse with respect to said plane, the free edge of said marginal portion lying outside the plane of said gasket sheet.

3. A gasket formed of a thin planar sheet of metal having an opening therethrough and having a single planar marginal portion surrounding and immediately adjacent to said opening bent out of the plane of said gasket sheet to an angle obtuse with respect to said plane, the free edge of said marginal portion lying outside the plane of said gasket sheet, at least one of the planar surfaces of said gasket sheet being provided with a thin heat-resisting compressible plastic coating.

4. A gasket formed of a thin sheet of flexible material having an aperture therein, said sheet having a main body and a smooth marginal portion surrounding the margin of said aperture, said marginal portion being integral with said main body portion and formed by smoothly bending said marginal portion through an angle less than 90° to establish an unwrinkled surface throughout the extent thereof, the free edge of said marginal portion lying outside the plane of the portion of said main body contiguous to said marginal portion.

References Cited in the file of this patent

UNITED STATES PATENTS

| Number | Name | Date |
|---|---|---|
| 2,289,620 | Bernstein | July 14, 1942 |

FOREIGN PATENTS

| Number | Country | Date |
|---|---|---|
| 270,448 | Italy | of 1930 |
| 522,375 | France | of 1921 |
| 810,728 | France | of 1937 |